United States Patent
Zarifi et al.

(10) Patent No.: US 10,285,186 B2
(45) Date of Patent: May 7, 2019

(54) SYSTEM AND METHOD FOR GROUPING AND SELECTING TRANSMISSION POINTS

(71) Applicant: Huawei Technologies Co., Ltd., Shenzhen (CN)

(72) Inventors: Keyvan Zarifi, Ottawa (CA); Mohammadhadi Baligh, Ottawa (CA); Aaron James Callard, Ottawa (CA); Jianglei Ma, Ottawa (CA); Mohamed Adel Salem, Kanata (CA); Mark Andrew Hawryluck, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 13/932,761

(22) Filed: Jul. 1, 2013

(65) Prior Publication Data
US 2014/0003268 A1 Jan. 2, 2014

Related U.S. Application Data

(60) Provisional application No. 61/666,487, filed on Jun. 29, 2012.

(51) Int. Cl.
| | |
|---|---|
| *H04W 72/12* | (2009.01) |
| *H04L 5/00* | (2006.01) |
| *H04W 48/20* | (2009.01) |
| *H04W 16/10* | (2009.01) |
| *H04W 16/32* | (2009.01) |

(52) U.S. Cl.
CPC ......... *H04W 72/121* (2013.01); *H04L 5/0073* (2013.01); *H04L 5/0035* (2013.01); *H04W 16/10* (2013.01); *H04W 16/32* (2013.01); *H04W 48/20* (2013.01)

(58) Field of Classification Search
CPC .... H04W 72/121; H04W 48/20; H04W 16/32
USPC ....................................................... 370/252
See application file for complete search history.

(56) References Cited

U.S. PATENT DOCUMENTS

| | | |
|---|---|---|
| 7,586,899 B1 | 9/2009 | Mohaban et al. |
| 2002/0085620 A1 | 7/2002 | Mesecher |
| 2007/0135172 A1* | 6/2007 | Lysejko et al. ............ 455/562.1 |

(Continued)

OTHER PUBLICATIONS

Huawei Technologies, Co., Ltd., "Cloud RAN-A Key Enabliing Technology for NG-RAN," Apr. 23, 2010, 12 pages.

(Continued)

*Primary Examiner* — Romani Ohri
(74) *Attorney, Agent, or Firm* — Slater Matsil, LLP

(57) ABSTRACT

A method for operating a centralized controller in a communications network with a plurality of transmission points includes generating a plurality of overlays for the communications network in accordance with first mutual intercell interference levels for transmission point pairs in the communications network, wherein each overlay of the plurality of overlays comprises virtual transmission points, and selecting a first overlay of the plurality of overlays in accordance with a merit measure derived from first user equipments (UEs) operating in the communications network tentatively scheduled to each overlay of the plurality of overlays. The method also includes scheduling a first subset of the first UEs operating in the communications network during a first resource unit in accordance with the selected first overlay.

23 Claims, 14 Drawing Sheets

(56) References Cited

U.S. PATENT DOCUMENTS

| | | | |
|---|---|---|---|
| 2007/0147248 A1 | 6/2007 | Kodialam et al. | |
| 2009/0088176 A1 | 4/2009 | Teo et al. | |
| 2010/0064008 A1 | 3/2010 | Yan et al. | |
| 2010/0099401 A1* | 4/2010 | Bishop | 455/422.1 |
| 2010/0105406 A1 | 4/2010 | Luo et al. | |
| 2010/0113059 A1* | 5/2010 | Morimoto | H04W 16/30 455/452.2 |
| 2010/0136994 A1* | 6/2010 | Kim | H04W 72/082 455/450 |
| 2011/0124345 A1 | 5/2011 | Lee et al. | |
| 2011/0199986 A1 | 8/2011 | Fong et al. | |
| 2011/0237272 A1 | 9/2011 | Gorokhov et al. | |
| 2012/0178462 A1* | 7/2012 | Kim | 455/450 |
| 2012/0207093 A1* | 8/2012 | Li | 370/328 |
| 2012/0230264 A1* | 9/2012 | Zhang | H04W 28/16 370/329 |
| 2013/0005376 A1* | 1/2013 | Shirani-Mehr | H04W 72/048 455/509 |

OTHER PUBLICATIONS

Batista, R.L., et al., "Performance Evalulation for Resource Allocation Algorithms in Comp Systems," Vehicular Technology Conference Fall (VTC 2010-Fall), 2010 IEEE $72^{nd}$, Sep. 6-9, 2010, 5 pages.

Jimaa, S., et al., "LTE-A an Overview and Future Research Areas,"Wireless and Mobile Computing, Networking and Communications (WiMob), 2011 IEEE $7^{th}$ International Conference, Oct. 10-12, 2011, pp. 395-399.

Baligh, H., "An Efficient Low-complexity MU-MIMO Scheduler for Cloud-RAN with Dirty Paper Coding," Global Communications Conference (Globecom), 2012 IEEE 55International Conference, Anaheim, California, Dec. 3-7, 2012, 5 pages.

Rahman, M., et al., "Interference Avoidance with Dynamic Inter-Cell Coordination for Downlink LTE System," IEEE Wireless Communications and Networking Conference, Apr. 5-8, 2009, 6 pages.

International Search Report and Written Opinion of Patent Cooperation Treaty (PCT), International Application No. PCT/US2013/048968, Applicant Futurewei Technologies, Inc., dated Sep. 17, 2013, 11 pages.

Extended European Search Report received in Application No. 13810473.2-1851 dated Jun. 3, 2015, 7 pages.

Zulhasnine, et al., "Topology-aware integration of cellular users into the PSP system," Vehicular Technology Conference, Sep. 5, 2011, 6 pages.

* cited by examiner

SYSTEM AND METHOD FOR GROUPING AND SELECTING TRANSMISSION POINTS

This application claims the benefit of U.S. Provisional Application No. 61/666,487, filed on Jun. 29, 2012, entitled "System and Method for Grouping and Selecting Transmission Points," which application is hereby incorporated herein by reference.

TECHNICAL FIELD

The present disclosure relates generally to digital communications, and more particularly to a system and method for grouping and selecting transmission points.

BACKGROUND

Cloud Radio Access Networks (CRAN) enabled joint processing (JP) techniques have shown significant promise in improving throughput and coverage, as well as reducing operating expenses, of Third Generation Partnership (3GPP) Long Term Evolution Advanced (LTE-A) communications networks. Typically, a strong backhaul link between transmission points (TP) and a central coordinating unit (CCU) is needed to form a joint transmission point from multiple TPs in a hyper-cell and realize multi-transmit point functionality inherent in CRAN.

An efficient implementation of joint scheduling and/or joint transmission also provided in the hyper-cell also requires stringent inter-TP synchronization, as well as accurate channel knowledge of the user equipment (UE) operating in the hyper-cell. Meeting these requirements and/or constraints may become infeasible as the size of the hyper-cells increases. Furthermore, computational costs involved in joint scheduling UEs also increases dramatically with the large number of UEs inherent in large hyper-cells.

SUMMARY OF THE DISCLOSURE

Example embodiments of the present disclosure which provide a system and method for grouping and selecting transmission points.

In accordance with an example embodiment of the present disclosure, a method for operating a centralized controller in a communications network with a plurality of transmission points is provided. The method includes generating, by the centralized controller, a plurality of overlays for the communications network in accordance with first mutual intercell interference levels for transmission point pairs in the communications network, wherein each overlay of the plurality of overlays comprises virtual transmission points, and selecting, by the centralized controller, a first overlay of the plurality of overlays in accordance with a merit measure derived from first user equipments (UEs) operating in the communications network tentatively scheduled to each overlay of the plurality of overlays. The method also includes scheduling, by the centralized controller, a first subset of the first UEs operating in the communications network during a first resource unit in accordance with the selected first overlay.

In accordance with an example embodiment of the present disclosure, a method for partitioning a communications network comprising a plurality of transmission points is provided. The method includes deriving, by a centralized controller, mutual intercell interference levels for transmission point pairs in the communications network from long term measures reported by user equipments operating in the communications network, and partitioning, by the centralized controller, the communications network into a plurality of clusters in accordance with the mutual intercell interference levels for the transmission point pairs and backhaul information for the communications network. The method also includes storing, by the centralized controller, information about the plurality of clusters.

In accordance with an example embodiment of the present disclosure, a centralized controller is provided. The centralized controller includes a processor. The processor generates a plurality of overlays for a communications network in accordance with first mutual intercell interference levels for transmission point pairs in the communications network, wherein each overlay of the plurality of overlays comprises virtual transmission points, selects a first overlay of the plurality of overlays in accordance with a merit measure derived from first user equipments (UEs) operating in the communications network tentatively scheduled to each overlay of the plurality of overlays, and schedules a first subset of the first UEs operating in the communications network during a first resource unit in accordance with the selected first overlay.

In accordance with an example embodiment of the present disclosure, a centralized controller is provided. The centralized controller includes a processor. The processor derives mutual intercell interference levels for transmission point pairs in a communications network from long term measures reported by user equipments operating in the communications network, partitions the communications network into a plurality of clusters in accordance with the mutual intercell interference levels for the transmission point pairs and backhaul information for the communications network, and stores information about the plurality of clusters.

One advantage of an embodiment is that JT processing overhead is reduced by partitioning a communications network into multiple clusters, which in turn are each partitioned into multiple overlays. As an example, a CRAN may be partitioned into multiple CRAN clusters, with each CRAN cluster being partitioned into multiple overlays or multiple sets of sub-clusters.

A further advantage of an embodiment is that with multiple overlays, it is ensured that no UE is a sub-cluster edge UE in all overlays. Therefore, if JT is possible for a UE, then it is ensured that JT can be used for the UE in at least one overlay.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to grouping and selecting transmission points using user equipment centric metrics. For example, a centralized controller generates a plurality of overlays for a communications network in accordance with first mutual intercell interference levels for transmission point pairs in the communications network, where each overlay of the plurality of overlays comprises virtual transmission points, selects a first overlay of the plurality of overlays in accordance with a merit measure derived from first user equipments (UEs) operating in the communications network tentatively scheduled to each overlay of the plurality of overlays, and schedules a subset of the first UEs operating in the communications network during a first resource unit in accordance with the selected first overlay.

As another example, a centralized controller derives mutual intercell interference levels for transmission point pairs in a communications network from long term measures reported by user equipments operating in the communications network, partitions the communications network into a plurality of virtual transmission points in accordance with the mutual intercell interference levels for the transmission point pairs and backhaul information for the communications network, and stores information about the plurality of virtual transmission points.

The present disclosure will be described with respect to example embodiments in a specific context, namely a CRAN deployment of a 3GPP LTE-A communications network. The disclosure may also be applied, however, to CRAN deployments of standards and non-standards compliant communications networks, as well as to other communications networks that allow transmission point grouping.

Figure 1A:
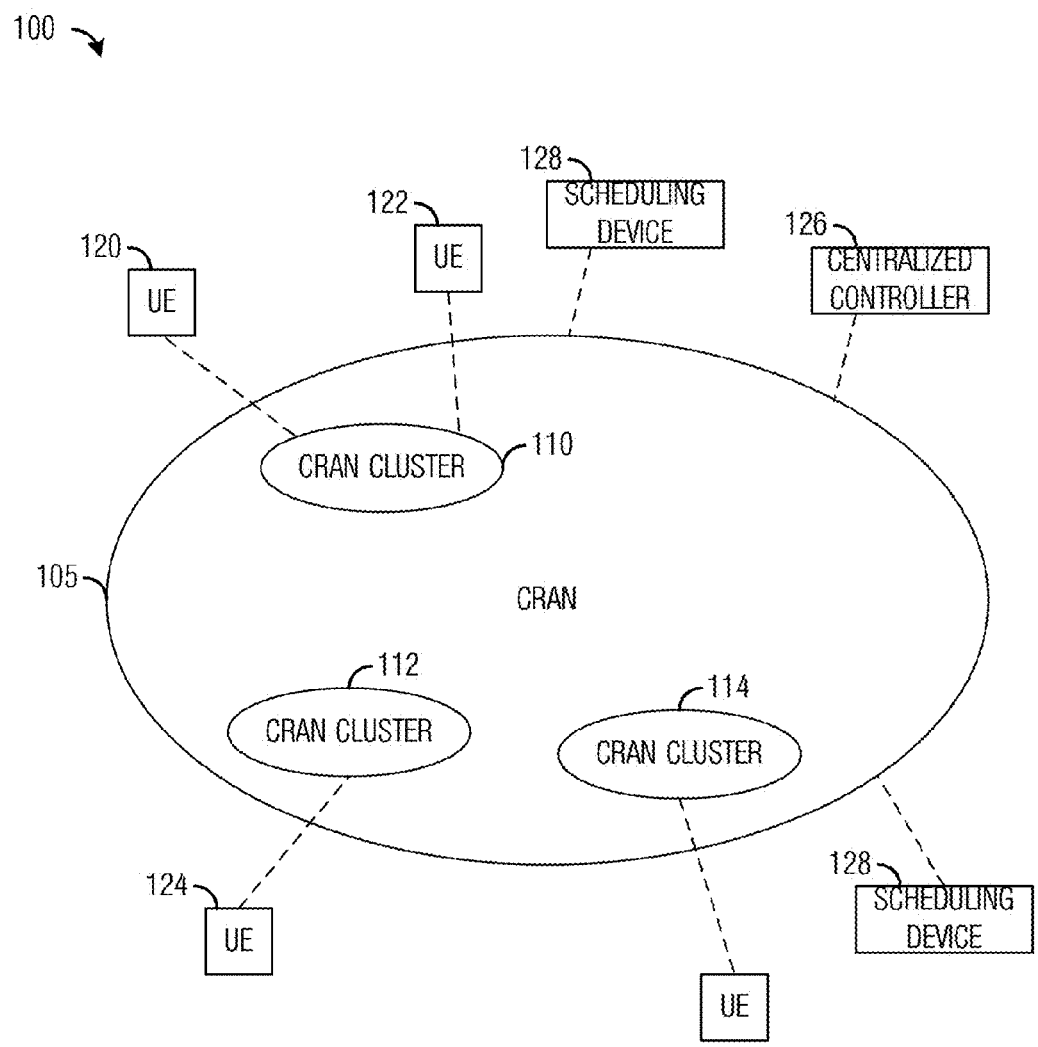
FIG. 1a illustrates an example communications network according to example embodiments described herein.

FIG. 1a illustrates a communications network 100. Communications network 100 includes a CRAN 105, which is partitioned into a plurality of CRAN clusters, such as CRAN cluster 110, CRAN cluster 112, and CRAN cluster 114. Each CRAN cluster may serve UEs. As an example, CRAN cluster 110 serves UE 120 and UE 122, while CRAN cluster 112 serves UE 124. It is noted that a CRAN cluster may serve a large number of UEs and that FIG. 1a illustrates only a small number of UEs to maintain simplicity. Each CRAN cluster may be partitioned into one or more virtual transmission points (V-TP), or equivalently, sub-clusters, which in turn may be formed from one or more TPs. A V-TP may be a one TP or a plurality of TPs that transmit jointly. In general, the CRAN clusters may have different numbers of V-TPs, TPs, and the like, as well as serve different numbers of UEs. Communications network 100 may also include a centralized controller 126 that may perform tasks such as CRAN partitioning, CRAN cluster overlay generation, CRAN cluster overlay selection, and the like. Communications network 100 may also include one or more scheduling devices 128 that may perform tasks such as UE scheduling for CRAN 105 and/or CRAN clusters in CRAN 105. It is noted that centralized controller 126 and/or scheduling device 128 may be individual entities, co-located with other entities (such as transmission points, communications controllers, and the like), or a combination thereof.

Figure 1B:
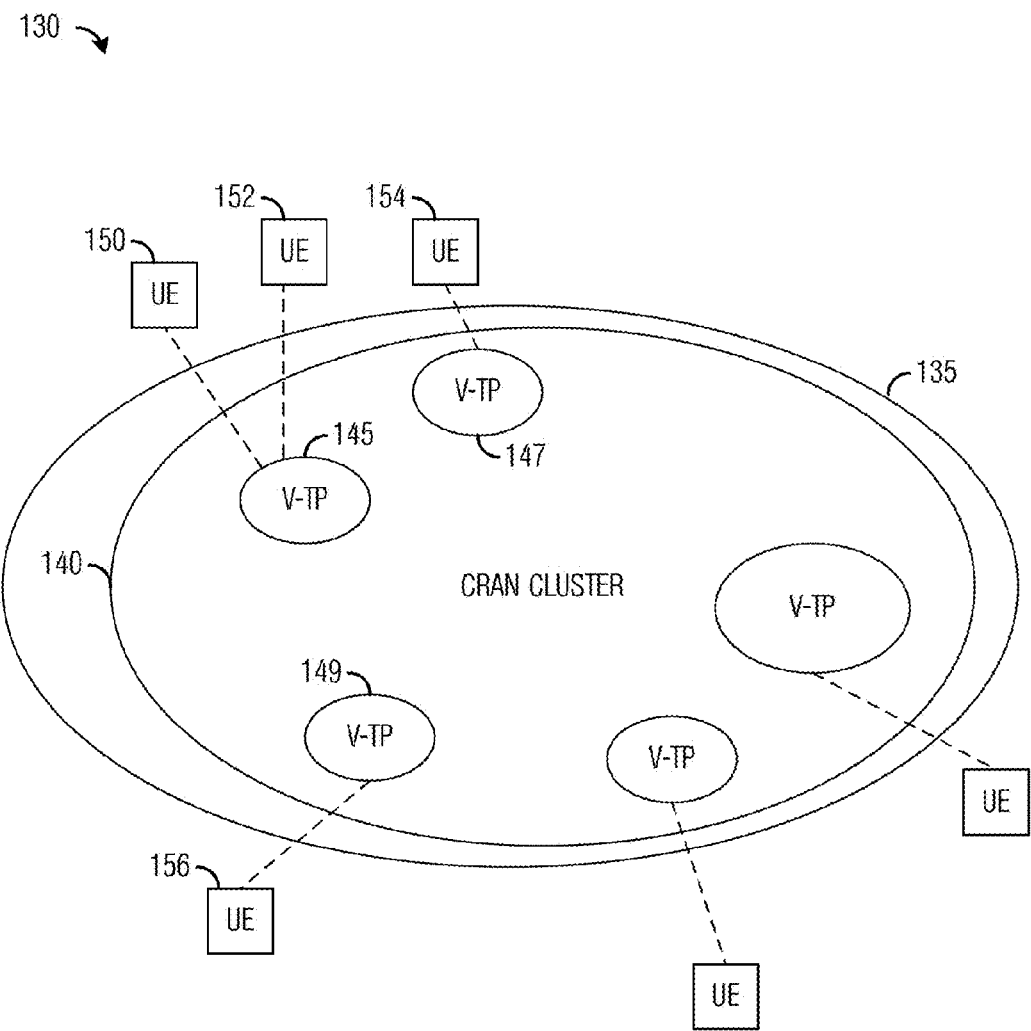
FIG. 1b illustrates an example communications network, where a single CRAN cluster is highlighted according to example embodiments described herein.

FIG. 1b illustrates a communications network 130, where a single CRAN cluster is highlighted. As shown in FIG. 1b, communications network 130 includes CRAN 135 that includes a CRAN cluster 140. It is noted that CRAN 135 may include other CRAN clusters, but only CRAN cluster 140 is shown. CRAN cluster 140 may be partitioned into a plurality of V-TPs (sub-clusters), such as V-TP 145, V-TP 147, and V-TP 149. In general, a V-TP may be a smallest allocatable JP unit. A V-TP may include one or more transmission points, such as an eNB, a cell, a relay node, a remote radio head, and the like. A single V-TP may serve one or more UEs. As an example, V-TP 145 may serve UE 150 and UE 152, while V-TP 147 serves UE 154 and V-TP 149 serves UE 156.

Figure 1C:
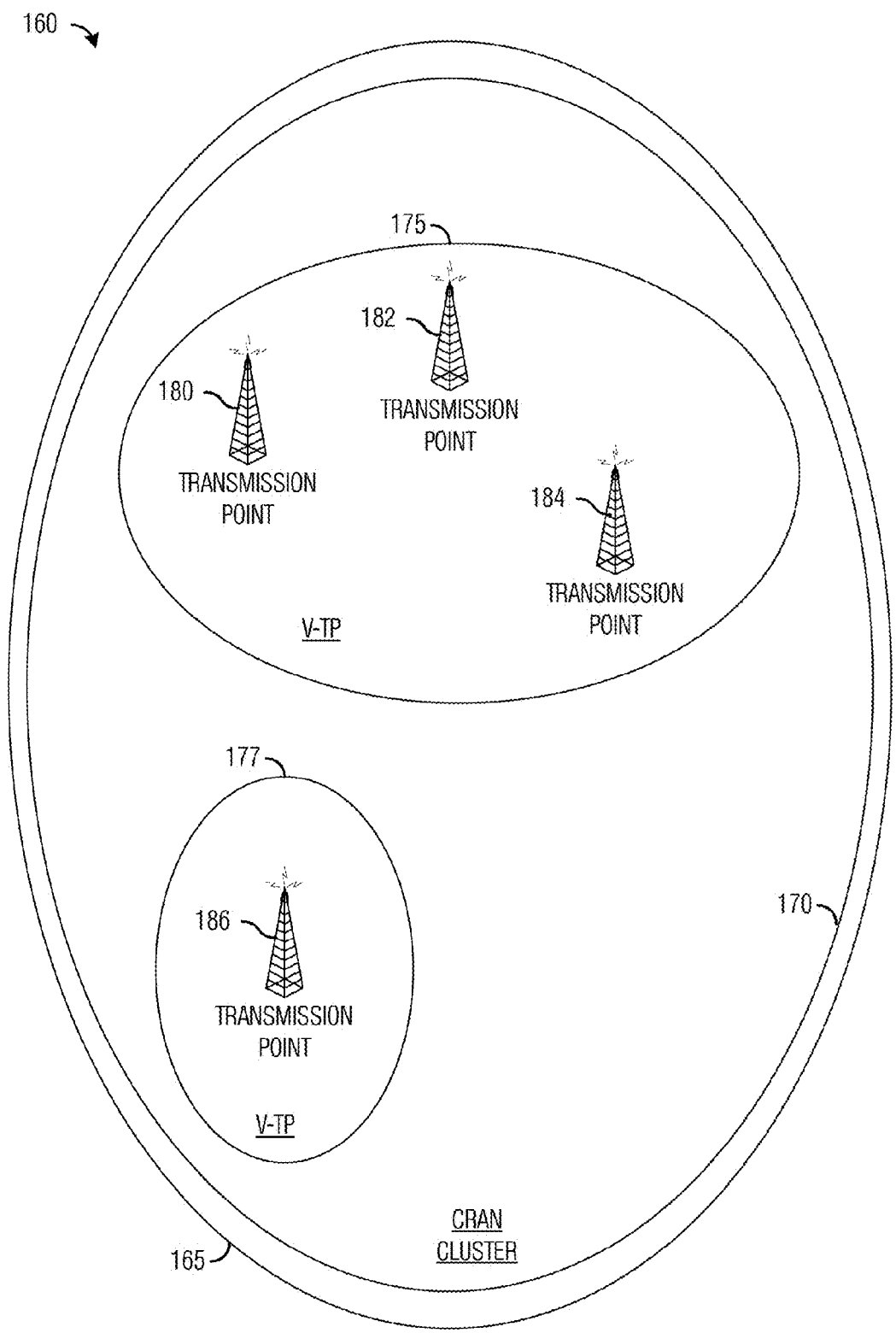
FIG. 1c illustrates an example communications network, wherein virtual transmission points (V-TPs), or equivalently sub-clusters, are highlighted according to example embodiments described herein.

FIG. 1c illustrates a communications network 160, wherein V-TPs are highlighted. As shown in FIG. 1c, communications network 160 includes CRAN 165 that includes a CRAN cluster 170. It is noted that CRAN 165 may include other CRAN clusters, but only CRAN cluster 170 is shown. CRAN cluster 170 may be partitioned into a plurality of V-TPs, such as V-TP 175, and V-TP 177. As discussed previously, a V-TP may include one or more transmission points, which may be an eNB, a cell, a relay node, a remote radio head, and the like. As an example, V-TP 175 includes three transmission points, transmission points 180-184, while V-TP 177 includes transmission point 186.

The previously discussed requirements and/or constraints along with increased computational costs involved in joint scheduling UEs in large hyper-cells suggest partitioning the communications network into multiple CRAN clusters and independently performing JP within each CRAN cluster. It is noted that the complexity of joint scheduling (measured in terms of complex operations) increases proportionally to the 4-th power of the number of scheduled transmission layers over the number of jointly scheduled UEs. As such, to fully exploit the centralized baseband signal processing capability of CRAN and while considering practical limitations on the maximum allowed size of JP in real deployments, the CRAN clusters are often required to be further partitioned to disjoint partitions. The TPs in each partition then act as a V-TP.

An important distinction of present embodiments for partition formation with respect to the partition formation technique is that more than one overlay (or equivalently, partition set) for each CRAN cluster is determined, with each overlay comprising multiple V-TPs (sub-clusters). A reason to form multiple overlays or partition sets per CRAN cluster is that there may be UEs that are located at the edge of a sub-cluster in any given overlay, which may be referred to as sub-cluster edge UEs. The sub-cluster edge UEs may therefore be incompatible to the given overlay. If scheduled in an incompatible overlay, the sub-cluster edge UEs tend to experience substantial interference from the neighboring sub-clusters. To avoid this problem, multiple overlays may be formed so that there is no UE in the CRAN cluster that is at the sub-cluster edge, i.e., a sub-cluster edge UE, in all overlays.

Figure 2:
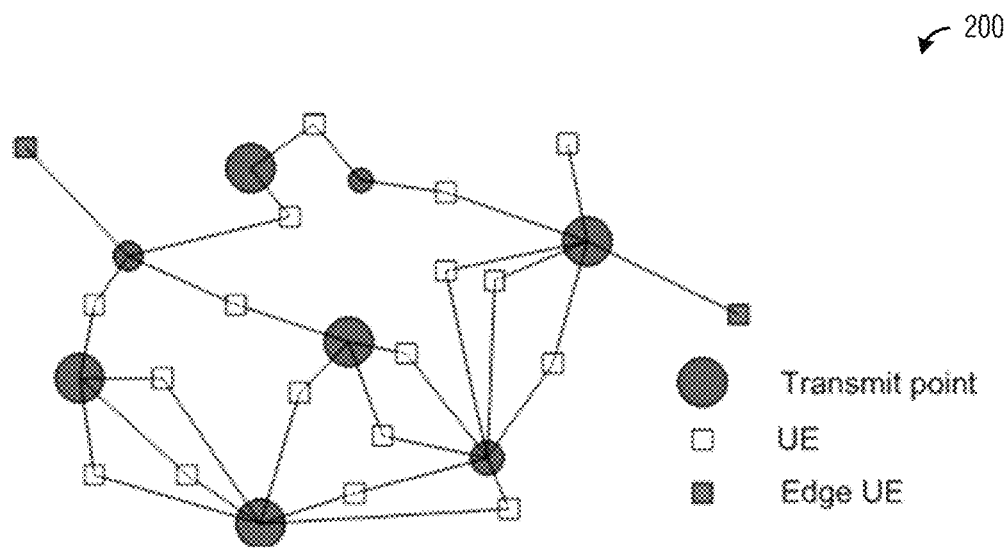
FIG. 2 illustrates an example CRAN cluster that is not partitioned according to example embodiments described herein.

FIG. 2 illustrates a communications network 200 that is not partitioned. Communications network 200 includes a plurality of TPs and a plurality of UEs with a strong backhaul connection between the TPs. Communications network 200 may be a CRAN cluster. As shown in FIG. 2, every UE selects its own TP or multiple TPs to provide service to the UE. As an example, a UE may select every TP with a reference signal received power (RSRP) measurement that is within 10 dB of a maximum. Advantages of the UEs selecting their own TPs include high throughput and good coverage. However, in order to realize the throughput improvement with increasing JP group size, the number of transmission layers (or simply layers) may also need to increase. This may lead to increased complexity, as well as more sensitivity to interference, load, UE mobility, synchronization, channel estimation, and the like. Furthermore, as JP group size increases, the design of an orthogonal demodulation reference signal (DMRS) may become more difficult. Additionally, at the UEs, interference may become a significant issue, with interference rejection and combining (IRC) becoming a bigger challenge.

Figure 3:
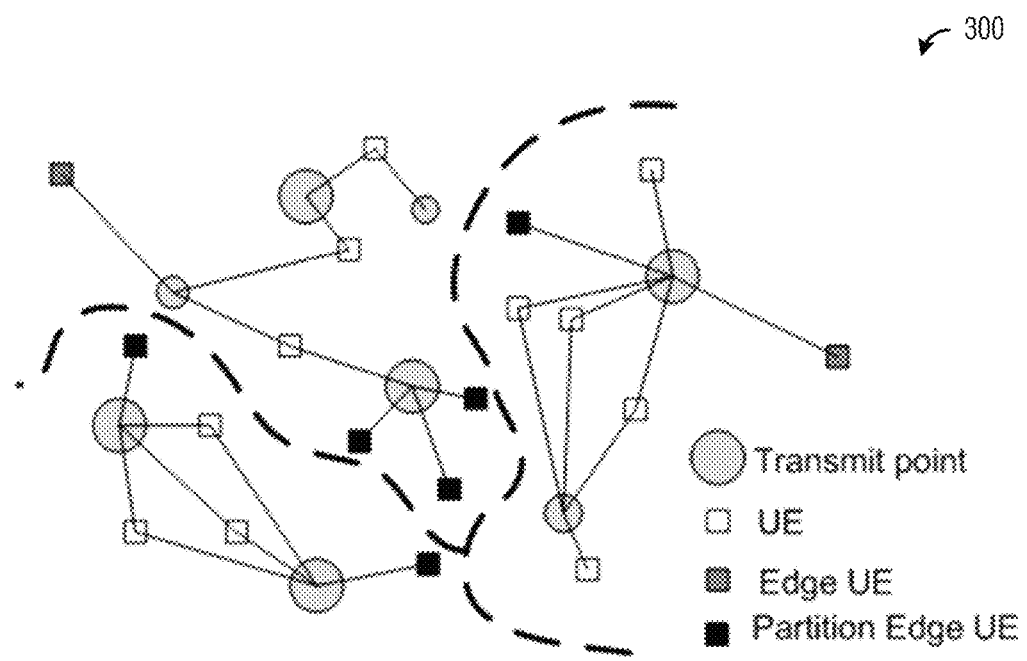
FIG. 3 illustrates an example CRAN cluster that has been partitioned into a single overlay according to example embodiments described herein.

FIG. 3 illustrates a communications network 300 that has been partitioned into a single overlay. As shown in FIG. 3, communications network 300 has been partitioned into three distinct sub-clusters (V-TPs), wherein the sub-clusters are shown with dashed lines. Each sub-cluster may be treated as a separate JP group. Partitioning helps to reduce the JP group size, which may help to reduce the difficulties discussed previously. As an example, reducing the JP group size may help to reduce the JP complexity. However, due to the partitioning of communications network 300, some UEs may experience a large interference from TPs in neighboring sub-cluster(s). Such UEs may be referred to as sub-cluster edge UEs and are represented as black squares in FIG. 3. Partitioning may also result in throughput reduction, as well as coverage loss.

According to an example embodiment, a communications network (or a CRAN cluster part of a communications network) may be partitioned into multiple overlays so that no UE is a sub-cluster edge UE in every overlay. Then, when a UE is to be scheduled, an overlay wherein the UE is not a sub-cluster edge UE may be selected.

Figure 4:
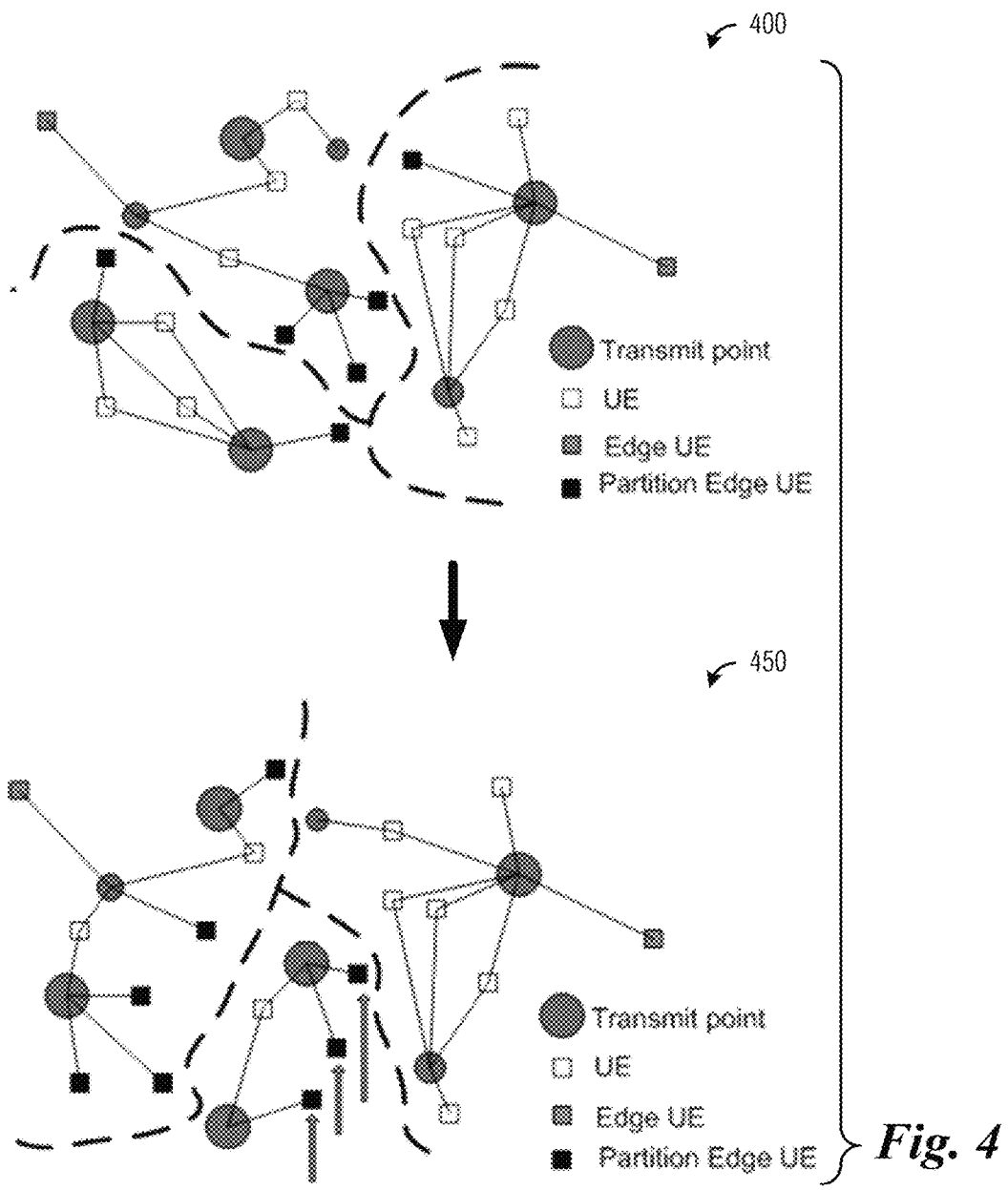
FIG. 4 illustrates an example CRAN cluster partitioned into a first overlay and a second overlay according to example embodiments described herein.

FIG. 4 illustrates a communications network partitioned into a first overlay 400 and a second overlay 450. In both first overlay 400 and second overlay 450, the communications network has been partitioned into three distinct sub-clusters, wherein the sub-clusters are shown with dashed lines. As shown in FIG. 4, some UEs that are sub-cluster edge UEs in first overlay 400 are no longer sub-cluster edge UEs. However, with two overlays, it may be possible that some UE are sub-cluster edge UEs in both overlays. As an example, the UEs highlighted with the hollow arrows are sub-cluster edge UEs in both first overlay 400 and second overlay 450.

Figure 5:
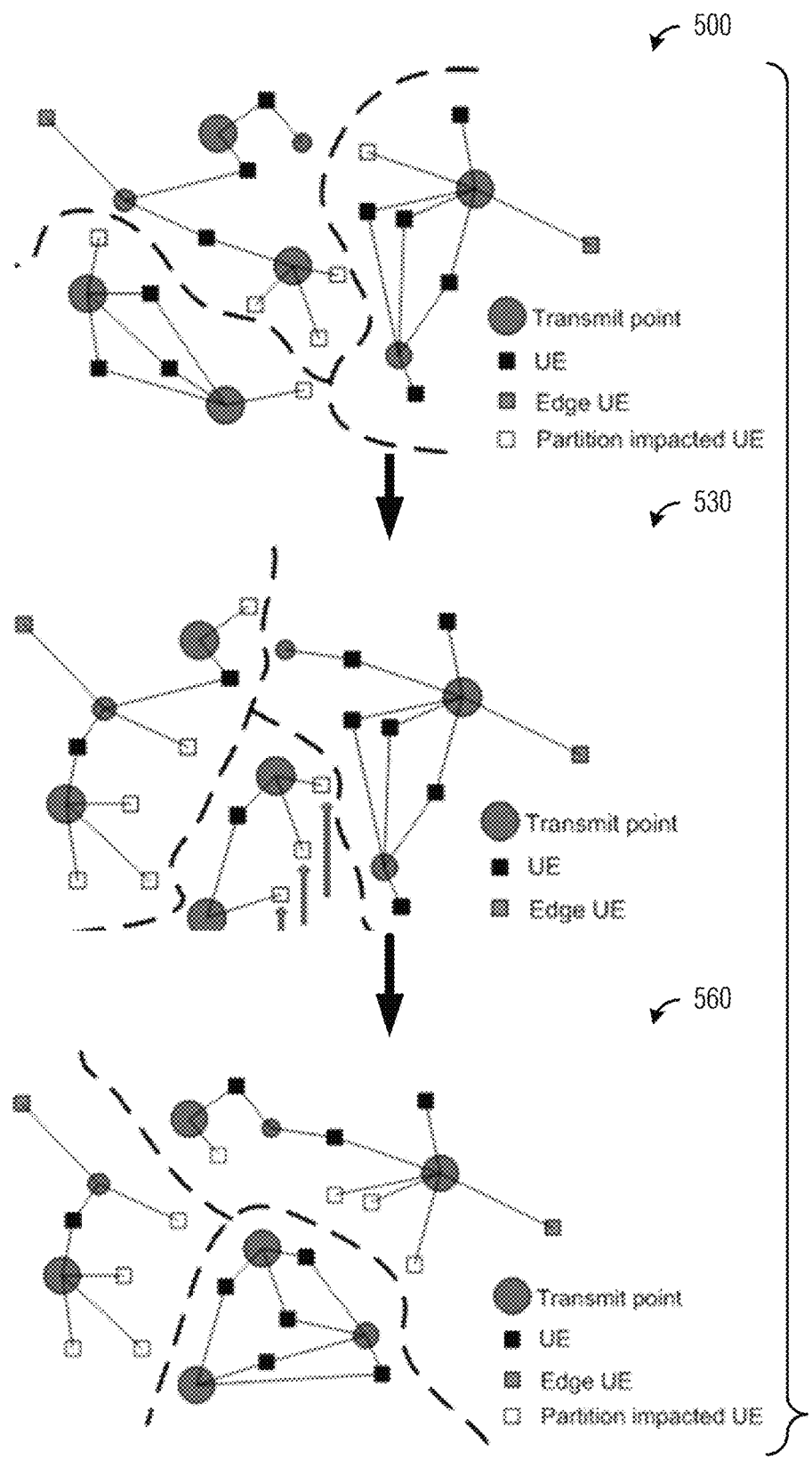
FIG. 5 illustrates an example CRAN cluster partitioned into a first overlay, a second overlay, and a third overlay according to example embodiments described herein.

FIG. 5 illustrates a communications network partitioned into a first overlay 500, a second overlay 530, and a third overlay 560. In first overlay 500, second overlay 530, and third overlay 560, the communications network has been partitioned into three distinct sub-clusters, wherein the sub-clusters are shown with dashed lines. With the addition of third overlay 560, UEs that are sub-cluster edge UEs in both first overlay 500 and second overlay 530 (e.g., the UEs highlighted with the hollow arrows) are no longer sub-cluster edge UEs (in third overlay 560).

Figures 6A, 6B, 6C:
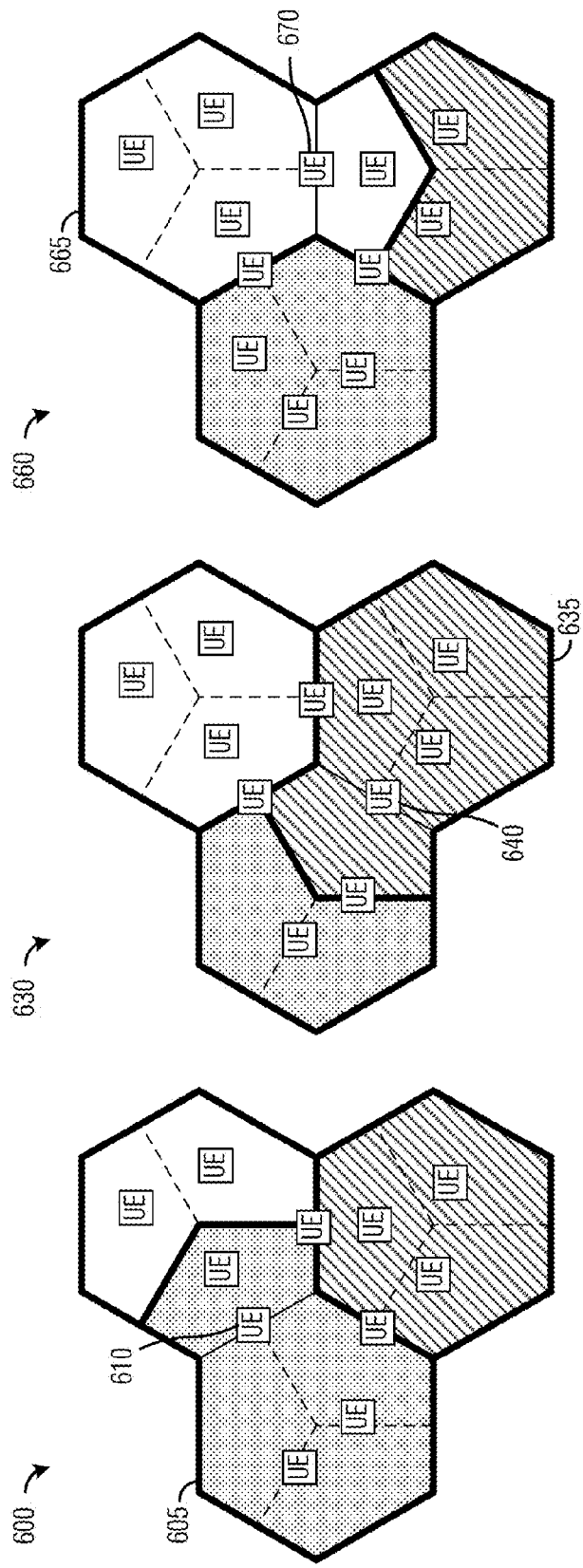
FIGS. 6a through 6c illustrate example overlays for a communications network according to example embodiments described herein.

FIG. 6a illustrates a first overlay 600 for a communications network. First overlay 600 includes a sub-cluster (V-TP) 605 that makes UE 610 a sub-cluster center UE. FIG. 6b illustrates a second overlay 630 for the communications network. Second overlay 630 includes a sub-cluster 635 that makes UE 640 a sub-cluster center UE. FIG. 6c illustrates a third overlay 660 for the communications network. Third overlay 660 includes a sub-cluster 665 that makes UE 670 a sub-cluster center UE. It is noted that the three overlays may be scheduled at different time instances and/or in different frequency bands to provide service to the UEs in the communications network with no UE being a sub-cluster edge UE in all three overlays.

FIGS. 6a through 6c highlights the joint scheduling using the overlays concept. As shown in FIGS. 6a through 6c, a CRAN cluster of nine cells may be partitioned into three different overlays, with each overlay including three sub-clusters (V-TPs). An overlay (out of the three overlays) may be selected dynamically at a resource unit, and UEs that are not sub-cluster edge UEs in the selected overlay may be scheduled.

A combined joint scheduling and dynamic overlay selection scheme approaches fully UE centric transmit point selection—with a limitation being that jointly processing and/or jointly transmitting TPs do not straddle sub-cluster boundaries. It is noted that computing a utility for each candidate overlay in support of a brute force search implies running the sum utility calculation multiple times. This results in a linear increase in complexity with respect to the number of tested overlays. However, where an effective automatic partitioning algorithm is used, only a few overlay candidates are needed and the search space is limited. Without the need to conduct full system level evaluation, it can be shown that it is possible to verify this important property of the example embodiments using a UE classification technique also proposed herein. This classification technique uses the long-term RSRP information and provides effective means of understanding the behavior of the partitioning algorithm.

As discussed previously, to reduce the computational burden of joint scheduling and/or joint transmission, it may be practical to partition the network into disjoint CRAN clusters perform joint scheduling and/or joint transmission separately within each CRAN cluster. Each CRAN cluster may be further partitioned into multiple overlays to simplify the scheduling algorithm while avoiding edge UEs inside the CRAN cluster. The following guidelines should be taken into account when partitioning the network into CRAN clusters:

1. A very high capacity backhaul connection such as a fiber connection should be available among the TPs in the same CRAN cluster.

2. The TPs with higher intercell interfering effect should be grouped into the same CRAN cluster. It is noted that once the TPs in the same CRAN cluster perform JP and/or joint transmission, the interfering TPs would be turned into helping TPs.

3. It may not be feasible to change the CRAN clusters of the communications network based on the varying short term intercell interference measurements. Therefore, it may be more pragmatic to partition the communications network into CRAN clusters based on some long-term average intercell interference (ICI) measurements in the communications network.

Figure 7:
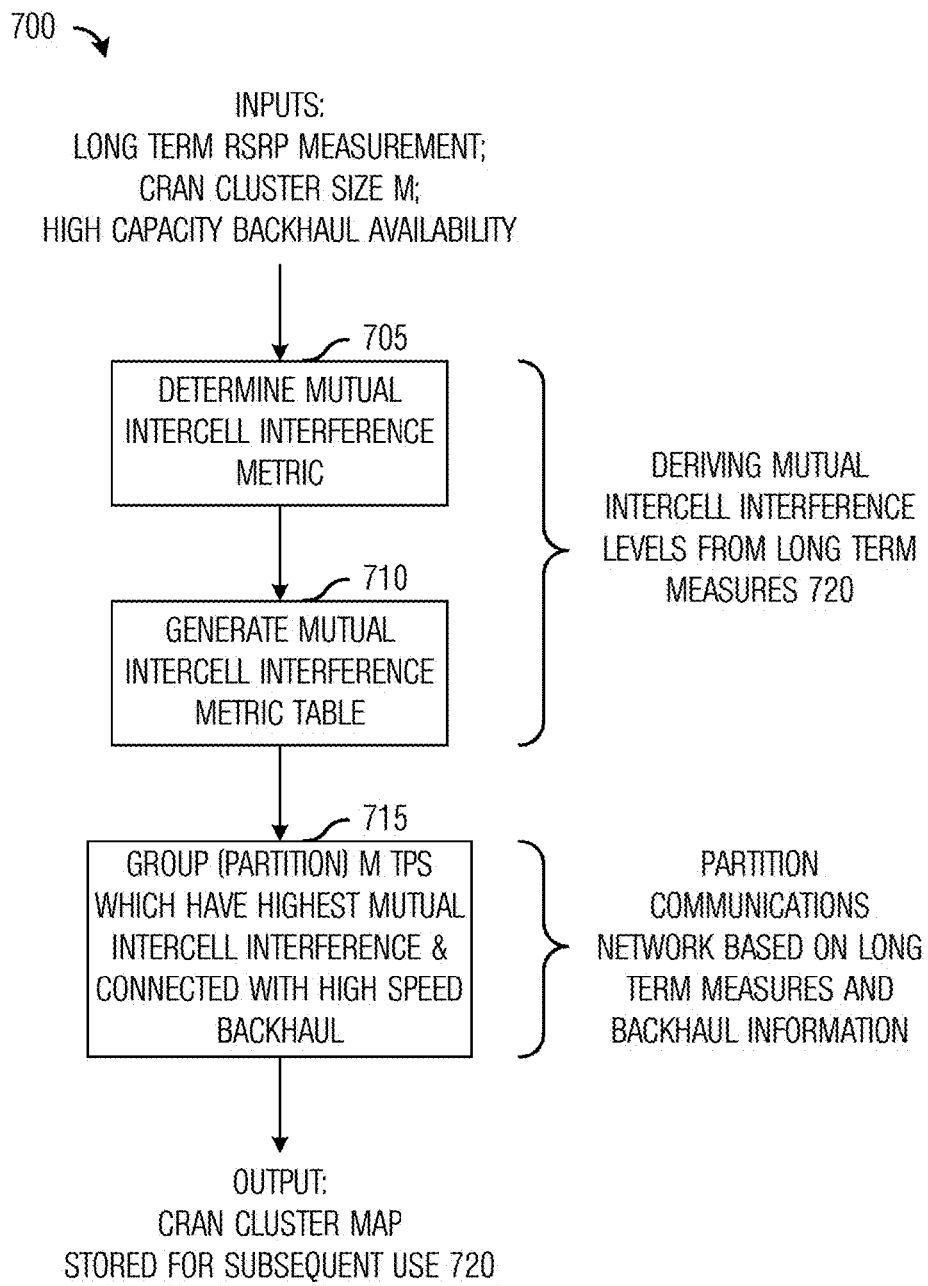
FIG. 7 illustrates an example flow diagram of operations in generating CRAN clusters according to example embodiment described herein.

FIG. 7 illustrates a flow diagram of operations 700 in generating CRAN clusters. Operations 700 may be indicative of operations occurring in a centralized controller, such as a CCU, as the CCU generates CRAN clusters from a communications network. Operations 700 utilize the above guidelines to group TPs into CRAN clusters. Long term measures, such as the RSRP measurements provided by UEs, as well as maximum CRAN cluster size and backhaul information (such as high capacity backhaul availability) may be provided as inputs. The RSRP measurements may be used to determine a level of mutual interference for transmissions between pairs of TPs to UEs served in the communications network (block 705). As an example, from the RSRP measurements provided by the UEs, the centralized controller may be able to determine for each UE served in the communications network, the long term interference levels from every TP in the communications network to a UE. From the long term interference levels, a mutual intercell interference metric for each pair of TPs may be obtained, providing a measure of how much interference is a first TP in the pair of TPs causing to (or producing in) the UEs in a second TP of the pair of TPs. The mutual intercell interference metrics may be gathered in the form of a mutual intercell interference table (block 710). Collectively, blocks 705 and 710 may be referred to as deriving mutual intercell interference levels from long term measures 720. Once the mutual intercell interference metric table is generated, a partitioning technique may be used to group TPs with high mutual intercell interference levels within CRAN clusters, depending on the availability of a strong, high speed backhaul to the centralized controller (block 715). In general, TPs with high mutual intercell interference may be used in CoMP operation (such as JT, JP, and the like) to improve communications network performance. As an illustrative example, TPs with high mutual intercell interference levels (e.g., mutual intercell interference level exceeding an interference threshold) and with a strong, high speed backhaul may be grouped into a single CRAN cluster. It is noted that the number of TPs per CRAN cluster may be limited by a maximum number of TPs per CRAN cluster, which is a configurable parameter. Hence, those TPs should be grouped together if they possess a capable backhaul, i.e., a backhaul that meets a performance threshold. As an example, the performance threshold may be a latency threshold, a data rate threshold, a capacity threshold, and the like. The grouping of the TPs effectively partitions the communications network in accordance with the long term measures (i.e., the mutual intercell interference levels) and backhaul information. Output of operations 700 may be CRAN clusters or CRAN cluster information for the communications network and may be stored for subsequent use (block 720).

Joint scheduling of the UEs in the whole CRAN cluster may still demand substantial computational resources even for medium sized CRAN clusters. In such cases, it makes sense to further partition the CRAN clusters to disjoint sub-clusters (V-TPs) and then perform JP within each sub-cluster. It is noted that the information exchange between sub-clusters is still possible due to the backhaul capacity among different sub-clusters in the CRAN cluster and may be used to further improve the network performance.

A shortcoming of partitioning a CRAN cluster into only one overlay is that the UEs at the borders between sub-clusters tend to experience higher ICI, such as shown in FIG. 4. As discussed previously, an effective approach to circumvent this shortcoming may be to partition the CRAN cluster into several different overlays (or equivalently, partition sets, sub-cluster sets, or V-TP sets). By properly selecting multiple overlays, it is ensured that, when the joint transmission is applied, all UEs are viewed as cell-center UEs in at least one of the overlays. Following two general guidelines may be applied in forming the overlays:

1. Every sub-cluster in each overlay should be formed from the TPs that tend to inflict more mutual ICI on one another. These are usually the neighboring TPs.

2. All CRAN cluster edge UEs not close to the CRAN cluster border should have a good chance to be CoMP recipient in at least one overlay. This is usually satisfied if there is no CRAN cluster edge UE that is also a sub-cluster edge UE in all overlays.

Figure 8:
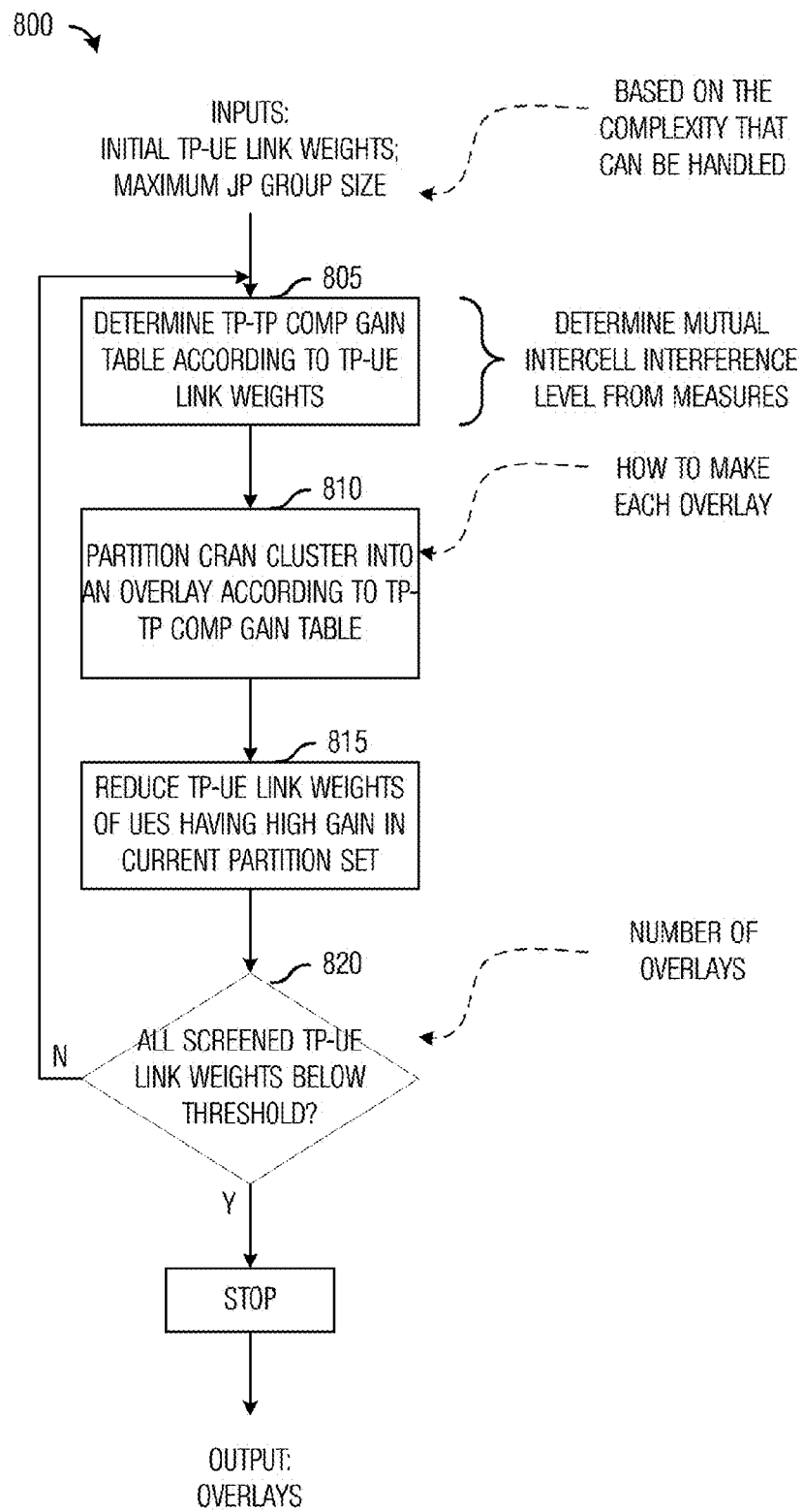
FIG. 8 illustrates an example flow diagram of operations in generating overlays according to example embodiments described herein.

FIG. 8 illustrates a flow diagram of operations 800 in generating overlays. Operations 800 may be indicative of operations occurring in a centralized controller, such as a CCU, as the CCU generates one or more overlays for a CRAN cluster of a communications network.

Operations 800 may make use of the above guidelines to group the TPs of a CRAN cluster into sub-clusters. Initial TP to UE (TP-UE) link weights and maximum JP group size may be inputs to operations 800. As an example, RSRP measurements may be used as TP-UE link weights. However, short term measures, such as short term channel measurements may also be used. The TP-UE link weights (e.g., the RSRP measurements) may be used to determine a level of mutual interference of each TP of the pairs of TPs on the UEs relative to the other TP of the same pair of TPs. The mutual interference levels may be used to form CoMP gain information, such as a CoMP gain table (block 805). Generally, an (i, j)-th entry of the CoMP gain table represents the mutual interference level between TPs i and j in the CRAN cluster. Once the CoMP gain table, i.e., the mutual interference table, is populated, a partitioning algorithm may be used that, upon the availability of strong backhaul to the same CCU, puts TPs with high mutual interference levels in the same sub-cluster (block 810). A maximum number of TPs per sub-cluster may also restrict the partitioning algorithm. Additionally, TPs with low mutual interference levels may be placed in different sub-clusters.

In order to generate multiple overlays, the TP-UE link weights of the UEs enjoying a high CoMP gain resulting from the overlays already partitioned from the CRAN cluster may be reduced (or increased depending on how the computation is designed) (block 815). In doing so, the effect of those UEs on CoMP gain information (i.e., the CoMP gain table once updated) will be reduced. As an example, TP-UE link weights of UEs that exceed a weight threshold may be reduced (or increased depending on computation design). In effect, the reduction of the TP-UE link weights helps to alter the mutual interference level of the TP-TP pairs by increasing the prominence of UEs that have not received high CoMP gain (or good signal quality) in the overlays that have already been partitioned from the CRAN cluster, and likely to have been separated from potential serving TPs. It is noted that the amount of change in the TP-UE link weights may be dependent on a desired number of overlays. As an example, if a small number of overlays are desired, then the reduction may be large, while if a large number of overlays are desired, then the reduction may be small. A check may be performed to determine if all TP-UE link weights are below a threshold (block 820). If they are, then operations 800 may be stopped and the overlays may be outputted. If they are not, then operations 800 may continue to produce additional overlay(s).

It is noted that the approach used to partition each CRAN cluster to overlays may be similar to the partition formation algorithm previously presented to partition a communications network into one or more CRAN clusters. A difference may be that since more than one overlay is required, the weight of the UEs that are at the center of the already-formed overlay are reduced when calculating the mutual interference levels between TPs. This results in an updated mutual ICI table that will be used to generate the next overlay. Another difference between overlay and CRAN cluster formation may be that overlay formation takes into account relatively short term ICI data. In this way, information formation can take into account variations in UE distribution and localized load variations.

A relatively straightforward UE classification analysis can show the effectiveness of the reduction of the sub-cluster edge UE population. The classification technique can be used to predict the performance of different partitioning hypotheses and to address as well the question of how many overlays are sufficient. It could be also used to show what fraction of CRAN cluster edge UEs (without considering joint transmission) would potentially benefit the most from a specific overlay. This classification technique is explained below.

An aim of the example embodiments is the identifying the following UE sets for the overlays generated by the partitioning algorithm:

The UEs at sub-cluster edge in any single overlay;

The UEs at sub-cluster edge across all overlays; and

The UEs at a CRAN cluster edge.

In order to conduct such an analysis, a metric and a classification criterion needs to be defined. Based on the RSRP information and CRAN cluster/overlay sub-clusters, a metric that is representative of the long-term SINR may be generated. The metric may be referred to as a CoMP geometry. Similar to the single-cell geometry, the numerator of the CoMP geometry is the algebraic sum of powers from all the TPs comprising a potential serving sub-cluster (V-TP) while the first term of the denominator represents the intra-cluster interference and the second term represents the out-of-sub-cluster interference as follows, $$G_{i,CoMP}(S) = \frac{\sum_{k \in S} P_{k,i}}{\sum_{\substack{m \in C_i \\ m \notin S}} P_{m,j} + \sum_{n \notin C_i} P_{n,i}}.$$

In the above, $P_{x,i}$ is the received power from cell x at $UE_i$, S is the set of TPs in the potentially serving sub-cluster for any given overlay, whereas $C_i$ is the set of TPs in the CRAN cluster of $UE_i$.

The maximum CoMP Geometry is then found across all overlays and all sub-clusters. The overlay where the UE achieves the maximum CoMP Geometry is noted as the UE's 'best overlay' as follows, $$G_{i,MaxCoMP} = \max_{S \subseteq C_i} \{G_{i,CoMP}(S)\}.$$

The UE classification technique adopts the following criteria thereafter: If the maximum CoMP geometry across all available sub-cluster hypotheses is lower than some threshold, the UE is generally classified as an "Edge UE". Furthermore, it may be possible to refine the classification as follows: If the total intra-cluster interference on the UE's best overlay is greater than the total out-of-cluster interference, then the UE is a "Partition Edge UE" or "Sub-cluster Edge UE". Otherwise, the UE is considered a "CRAN Cluster Edge UE".

Once the CRAN cluster is formed into several overlays, an immediate question may be how to use each overlay during the scheduling process. It is proposed to calculate a sum proportional fairness (PF) measure associated with the use of every overlay at each resource block group (RBG) or resource unit (RU) and then use the overlay with the maximum sum PF measure in that RBG. The RBG-based overlay selection provides the possibility to enable UE centric best overlay selection.

Figure 9:
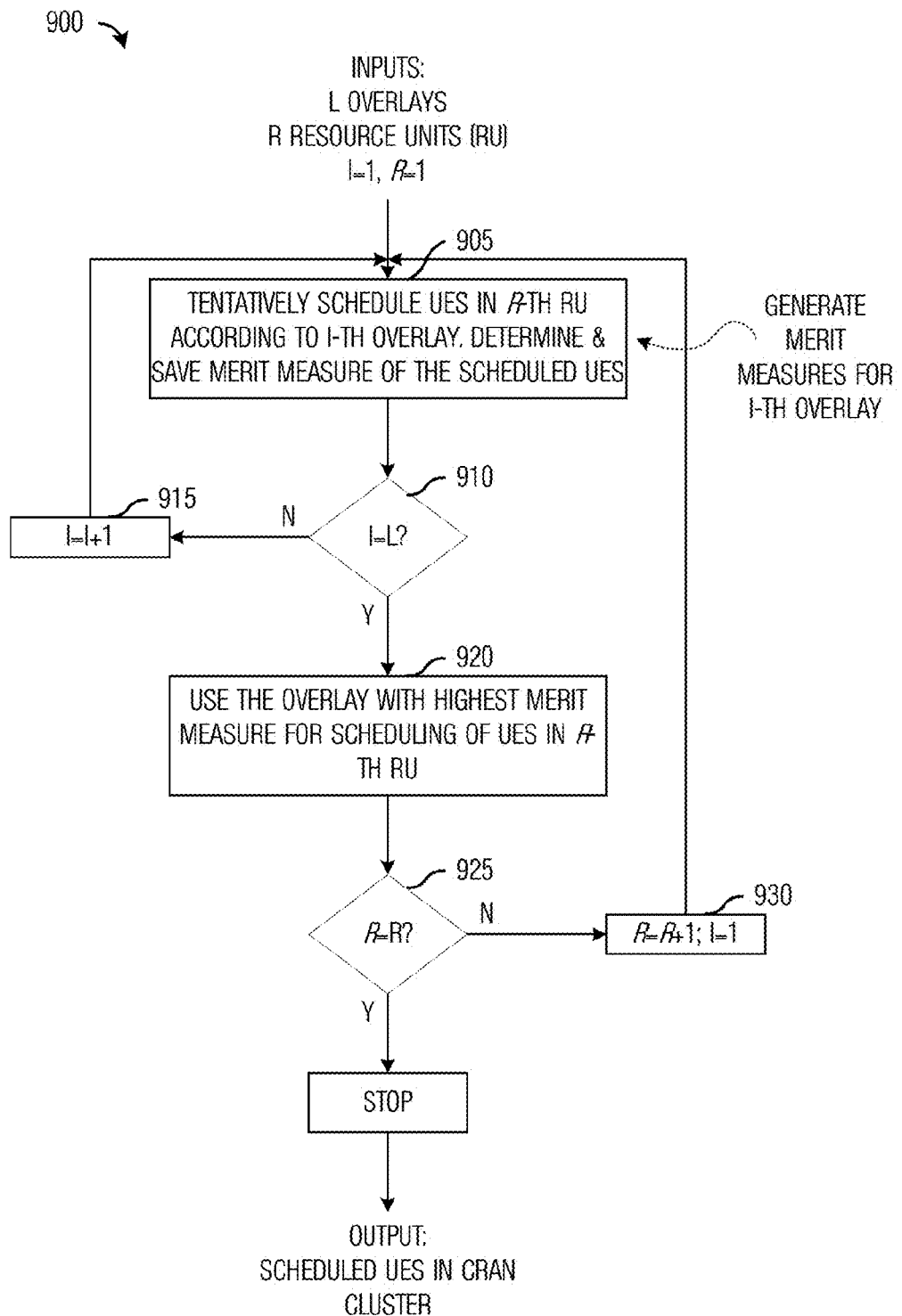
FIG. 9 illustrates an example flow diagram of operations in selecting and using overlays during a scheduling of UEs according to example embodiments described herein.

FIG. 9 illustrates a flow diagram of operations 900 in selecting and using overlays during a scheduling of UEs. Operations 900 may be indicative of operations occurring in a centralized controller, such as a CCU, or in a scheduling device, such as a TP, such as an eNB, a cell, a relay node, a remote radio head, and the like.

L overlays and R RUs may be inputs to operations 900. Furthermore, variables, such as l and R may be initialized. UEs may be tentatively scheduled to an R-th RU (or RBG) according to an l-th overlay (block 905). As an illustrative example, tentatively scheduling UEs means that the scheduling device may follow a scheduling procedure, including selecting UEs for the purpose of assigning resources to transmissions to or from the UEs using a UE selection function but not actually assigning the resources to the UEs. In other words, in tentatively scheduling UEs, the scheduling entity pretends to schedule the UEs. Additionally, a merit measure of the scheduled UEs may be determined and saved for subsequent use (block 905). As an example, a sum proportional fairness of the scheduled UEs may be used as a merit measure. Other examples include data rate, scheduling fairness, UE data queue length, UE wait time, and the like. In other words, block 905 may generate merit measures for the L overlays. A check may be performed to determine if all L overlays have been used (block 910). In other words, the check may determine if UEs have been tentatively scheduled for all L overlays. If no, variables may be updated (block 915) and block 905 may be repeated for another overlay, e.g., the next overlay.

If yes, an overlay associated with a highest merit measure may be selected and used for scheduling UEs in the R-th RU (block 920). A check may be performed to determine if all R RUs have been scheduled (block 925). If no, variables may be updated (block 930) and block 905 may be repeated for another RU. If yes, the scheduled UEs for the sub-clusters (i.e., the CRAN cluster) and the RUs may be outputted.

Figure 10:
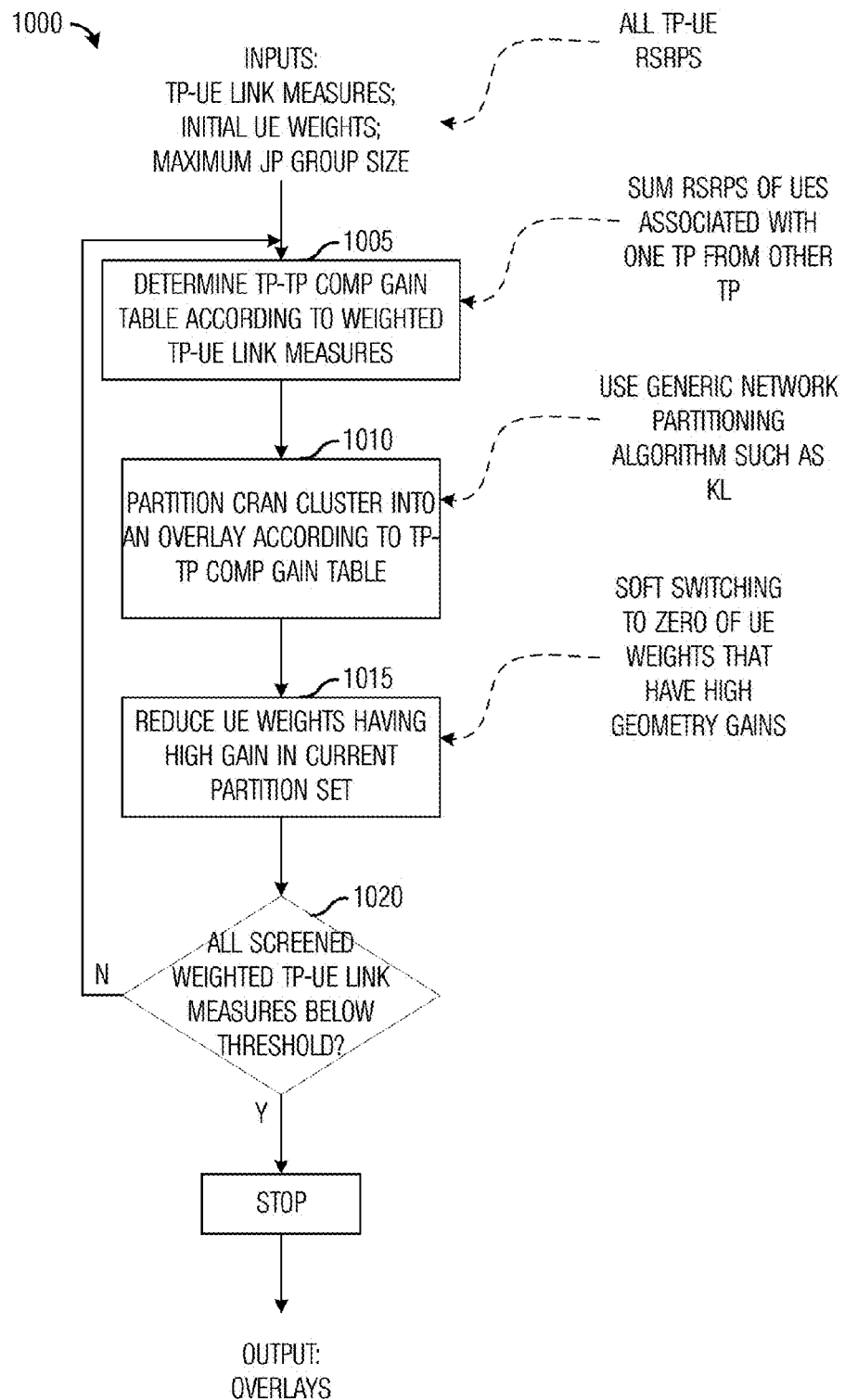
FIG. 10 illustrates an example flow diagram of operations in an alternative embodiment for generating overlays according to example embodiments described herein.

FIG. 10 illustrates a flow diagram of operations 1000 in an alternative embodiment for generating overlays. Operations 1000 may make use of TP-UE link measures and UE weights rather than TP-UE link weights as described in FIG. 8.

Operations 1000 may make use of the above guidelines to group the TPs of a CRAN cluster into sub-clusters. Initial TP to UE (TP-UE) link weights and maximum JP group size may be inputs to operations 1000. As an example, RSRP measurements may be used as TP-UE link weights. However, short term measures may also be used. The TP-UE link weights (e.g., the RSRP measurements) may be used to determine a level of mutual interference of each TP in the pairs of TPs on the UEs that are associated with the other TP in the pair of TPs, with the level of mutual interference being used to form a CoMP gain table (block 1005). Once the CoMP gain table, i.e., the mutual interference metric table, is populated, a partitioning algorithm may be used that, upon the availability of strong backhaul to the same CCU, puts TPs with high mutual interference levels in the same sub-cluster (V-TP) (block 1010). Additionally, TPs with low mutual interference levels may be placed in different sub-clusters.

In order to generate multiple overlays, the TP-UE link weights of the UEs having high CoMP gain in overlays already partitioned may be reduced (or increased depending on how the computation is designed) (block 1015). In effect, the reduction of the TP-UE link weights helps to change the mutual interference level of the TP-TP pairs. It is noted that the amount of change in the TP-UE link weights may be dependent on a desired number of overlays. As an example, if a small number of overlays are desired, then the reduction may be large, while if a large number of overlays are desired, then the reduction may be small. A check may be performed to determine if all TP-UE link weights are below a threshold (block 1020). If they are, then operations 1000 may be stopped and the overlays may be outputted. If they are not, then operations 1000 may continue to produce additional overlay(s).

Figure 11:
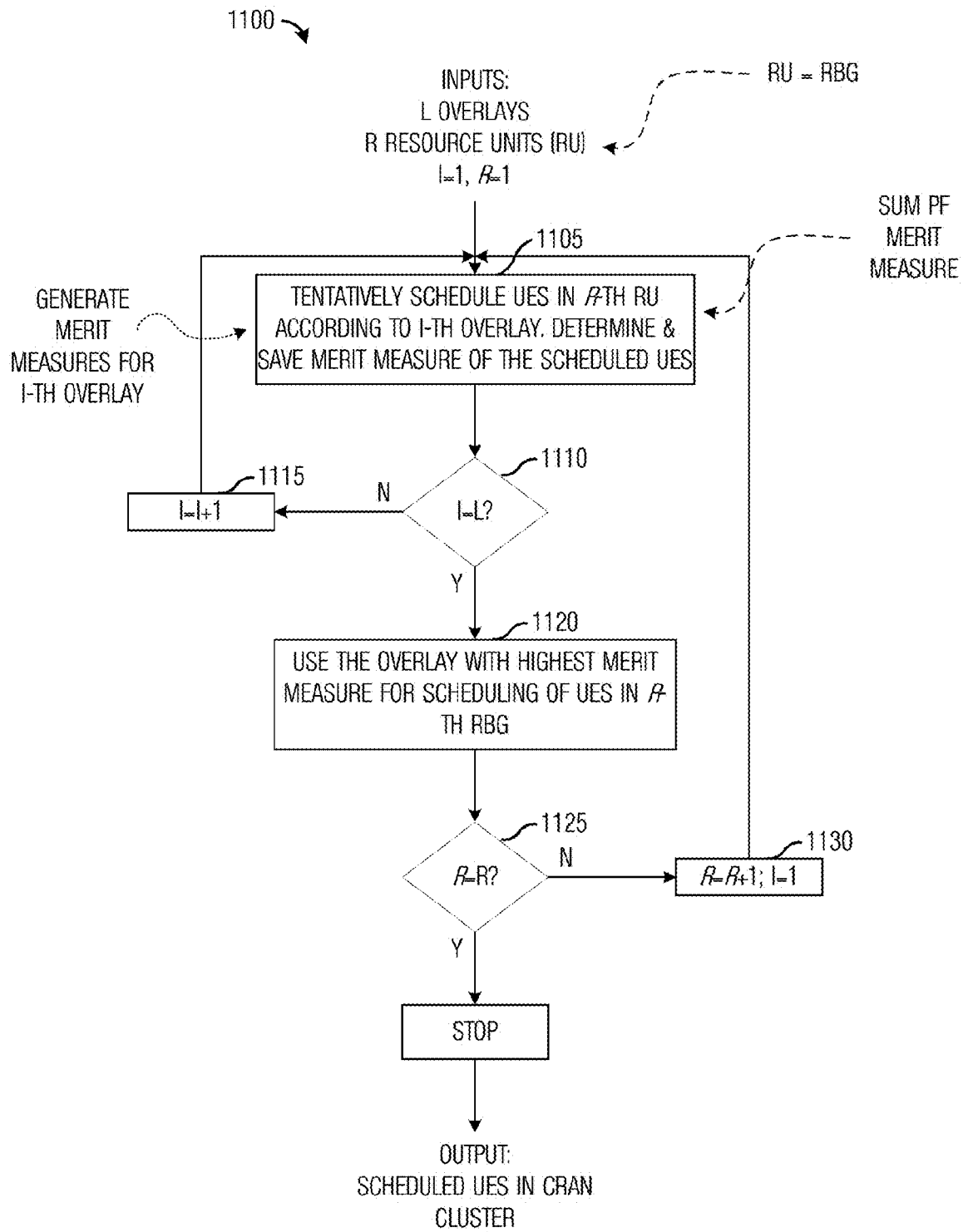
FIG. 11 illustrates an example flow diagram of operations in an alternative embodiment in selecting and using overlays during a scheduling of UEs according to example embodiments described herein.

FIG. 11 illustrates a flow diagram of operations 1100 in an alternative embodiment in selecting and using overlays during a scheduling of UEs. Operations 1100 may make use of a sum PF measure and schedule UEs for a RBG in selecting and using the overlays.

L overlays and R RUs may be inputs to operations 1100. Furthermore, variables, such as l and R may be initialized. UEs may be scheduled (provisionally scheduled) to an R-th RU (or RBG) according to an l-th overlay (block 1105). Additionally, a merit measure of the scheduled UEs may be determined and saved for subsequent use (block 1105). In general, block 1105 may generate merit measures for the L overlays. A check may be performed to determine if all L overlays have been used (block 1110). In other words, the check may determine if UEs have been provisionally scheduled for all L overlays. If no, variables may be updated (block 1115) and block 1105 may be repeated for another overlay, i.e., the l-th overlay.

If yes, an overlay with highest merit measure may be used for scheduling UEs in the R-th RU (block 1120). A check may be performed to determine if all R RUs have been used (block 1125). If no, variables may be updated (block 1130) and block 1105 may be repeated for another RU. If yes, the scheduled UEs for the sub-clusters (i.e., the CRAN cluster) and the RUs may be outputted.

Figure 12:
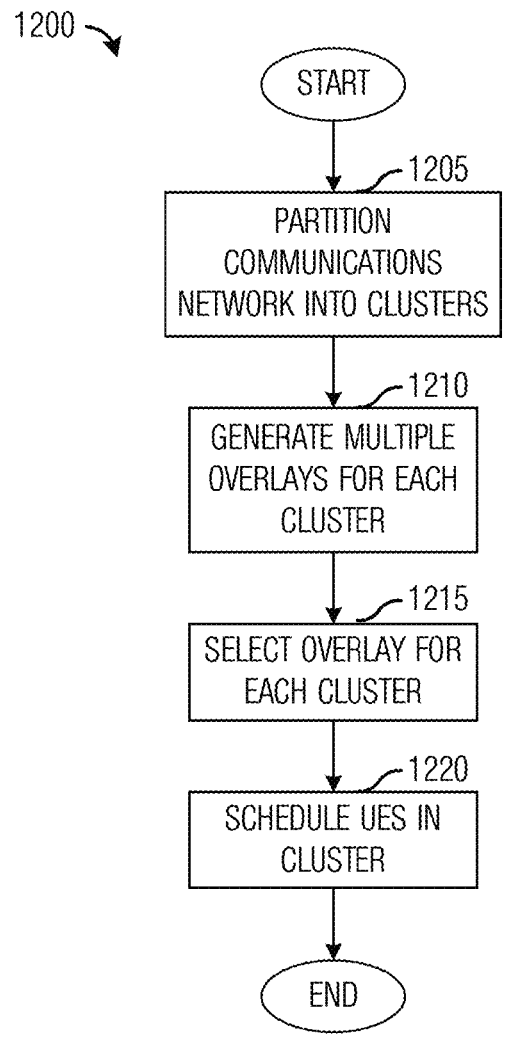
FIG. 12 illustrates an example flow diagram of operations in scheduling UEs in a cluster according to example embodiments described herein.

FIG. 12 illustrates a flow diagram of operations 1200 in scheduling of UEs in a cluster. Operations 1200 may be indicative of operations occurring in a centralized controller, such as a CCU, or in a scheduling device, such as a TP, such as an eNB, a cell, a relay node, a remote radio head, and the like.

Operations 1200 may begin with the centralized controller partitioning a communications network into clusters (block 1205). As an example, the centralized controller may partition the communications network into a plurality of CRAN clusters. Block 1205 may be implemented as shown in FIG. 7, for example. The centralized controller may generate multiple overlays for each cluster or for the communications network (block 1210). The centralized controller may use UE-centric mutual intercell interference information (e.g., mutual intercell interference levels arranged in a mutual intercell interference table) for TP pairs to generate the multiple overlays. Block 1210 may be implemented as shown in FIGS. 8 and 10, for example. The centralized controller may select an overlay for each cluster or the communications network (block 1215). The centralized controller may select the overlay by tentatively scheduling transmission(s) to one or more UEs within the cluster or the communications network using each overlay and generate a merit measure utilizing the tentatively scheduled UE(s). As an example, the centralized controller may select an overlay associated with a largest merit measure to use in the scheduling of UEs in the cluster or the communications network. The centralized controller may use the selected overlay to schedule UEs in the cluster or the communications network (block 1220).

Figure 13:
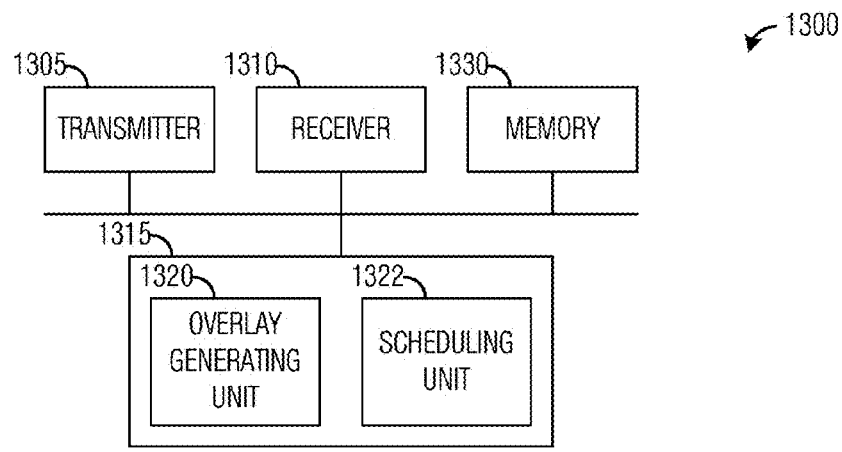
FIG. 13 illustrates an example communications device according to example embodiments described herein.

FIG. 13 provides an illustration of a communications device 1300. Communications device 1300 may be an implementation of a centralized controller, such as a CCU, an eNB, and the like, or a scheduler. Communications device 1300 may be used to implement various ones of the embodiments discussed herein. As shown in FIG. 13, a transmitter 1305 is configured to send packets and a receiver 1310 is configured to receive packets. Transmitter 1305 and receiver 1310 may have a wireless interface, a wireline interface, or a combination thereof.

An overlay generating unit 1320 is configured to generate one or more overlays for a CRAN cluster of a communications network. Overlay generating unit 1320 uses information about TP-UE pairs, such as channel quality information, RSRP measurements, and the like, to generate mutual interference information for pairs of TPs. Overlay generating unit 1320 uses the mutual interference information to partition the TPs. Overlay generating unit 1320 is also configured to generate CRAN clusters for a communications network. As an example, overlay generating unit 1320 groups TPs that have high mutual interference levels into a single sub-cluster, while separating TPs that have low mutual interference levels. Overlay generating unit 1320 generates multiple overlays by adjusting the information about the TP-UE pairs to alter their relationship. A scheduling unit 1322 is configured to schedule UEs for each of the one or more overlays. For a single resource unit, scheduling unit 1322 schedules UEs that are not sub-cluster edge UEs and generates a merit measurement for each overlay. Scheduling unit 1322 selects the overlay having the highest merit measurement for the resource unit as the overlay for the resource unit. Scheduling unit 1322 repeats the scheduling for all resource units. A memory 1330 is configured to store TP-UE pair information, mutual interference information, overlay information, sub-cluster information, CRAN cluster, and so on.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, transmitter 1305 and receiver 1310 may be implemented as a specific hardware block, while overlay generating unit 1320 and scheduling unit 1322 may be software modules executing in a processor 1315, a microprocessor, a custom circuit, or a custom compiled logic array of a field programmable logic array. Overlay generating unit 1320 and scheduling unit 1322 may be modules stored in memory 1330

Figure 14A:
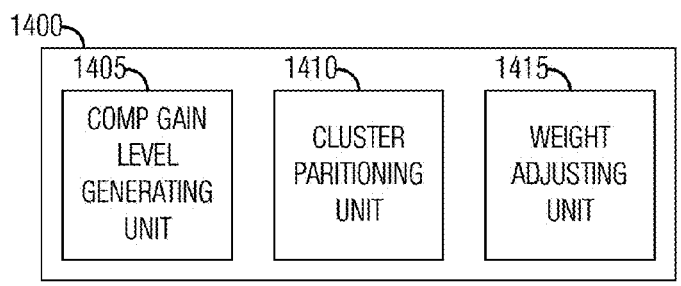
FIG. 14a illustrates an example detailed view of an overlay generating unit according to example embodiments described herein.

FIG. 14a illustrates a detailed view of an example overlay generating unit 1400. Overlay generating unit 1400 includes a CoMP gain level generating unit 1405 that is configured to generate the mutual interference information, a system partitioning unit 1410 that is configured to group the TPs of a communications network into sub-clusters, and a weight adjusting unit 1415 that is configured to adjust TP-UE information to alter the relationship between different TPs.

Figure 14B:
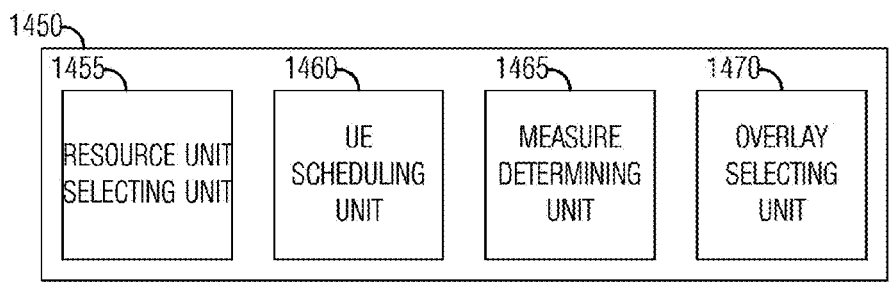
FIG. 14b illustrates an example detailed view of a scheduling unit according to example embodiments described herein.

FIG. 14b illustrates a detailed view of an example scheduling unit 1450. Scheduling unit 1450 includes a resource unit selecting unit 1455 that is configured to select a resource unit for UE scheduling, a UE scheduling unit 1460 that is configured to schedule UEs for a selected resource unit according to an overlay, a measure determining unit 1465 that is configured to generate a merit measurement for a particular set of scheduled UEs during a resource unit, and an overlay selecting unit 1470 that is configured to set an overlay for use in a resource unit according to the merit measurements.

Although the present disclosure and its advantages have been described in detail, it should be understood that various changes, substitutions and alterations can be made herein without departing from the spirit and scope of the disclosure as defined by the appended claims.

What is claimed is:

1. A method for operating a centralized controller in a communications network with a plurality of transmission points, the method comprising:
generating, by the centralized controller, a plurality of partition sets for the communications network in accordance with first mutual intercell interference levels for transmission point pairs in the communications network, each of the plurality of partition sets includes the plurality of transmission points, each of the plurality of partition sets having multiple sub-clusters, each of the sub-clusters containing at least one of the plurality of transmission points, wherein each user equipment (UE) of all UEs served by the plurality of transmission points is not a sub-cluster edge UE in each of the sub-clusters of at least one partition set of the plurality of partition sets;
selecting, by the centralized controller, a first partition set of the plurality of partition sets in accordance with a merit measure, the merit measure being a maximum measure of a plurality of merit measures derived from first UEs operating in the communications network tentatively scheduled to each partition set of the plurality of partition sets, the merit measure comprising at least one of a sum proportional fairness of the first UEs or a scheduling fairness; and
scheduling, by the centralized controller, a first subset of the first UEs operating in the communications network during a first resource unit in accordance with the selected first partition set.

2. The method of claim 1, wherein generating the plurality of partition sets comprises:
deriving the first mutual intercell interference levels for the transmission point pairs from UE link weights, the UE link weights determined from at least one of long term measures reported by second UEs operating in the communications network and associated with the transmission point pairs, and short term measures reported by the second UEs operating in the communications network and associated with the transmission point pairs;
partitioning the communications network into a second partition set comprising a second plurality of virtual transmission points in accordance with the first mutual intercell interference levels for the transmission point pairs;
adjusting the UE link weights that exceed a weight threshold;
deriving second mutual intercell interference levels for the transmission point pairs from the adjusted UE link weights; and
partitioning the communications network into a third partition set comprising a third plurality of virtual transmission points in accordance with the second mutual intercell interference levels for the transmission point pairs.

3. The method of claim 2, wherein adjusting the UE link weights comprises reducing the UE link weights.

4. The method of claim 2, further comprising partitioning the communications network into the second partition set in accordance with a maximum number of transmission points per virtual transmission point.

5. The method of claim 1, wherein the first mutual intercell interference levels comprise transmission point to transmission point coordinated multiple point (CoMP) gain.

6. The method of claim 1, wherein selecting the first partition set of the plurality of partition sets comprises:
for each fourth partition set in the plurality of partition sets:
generating the merit measure for a second subset of the first UEs operating in the communications network and tentatively scheduled in accordance with the fourth partition set; and
selecting a fifth partition set associated with a largest merit measure of the plurality of merit measures as the first partition set.

7. The method of claim 6, wherein generating the merit measure comprises:
tentatively scheduling the second subset of the first UEs operating in the communications network to communicate during the first resource unit, the tentatively scheduling performed in accordance with the fourth partition set; and
determining the merit measure for the tentatively scheduled second subset of the first UEs operating in the communications network.

8. The method of claim 7, wherein the merit measure comprises one of a sum proportional fairness for the tentatively scheduled second subset of the first UEs operating in the communications network, data rate for the tentatively scheduled second subset of the first UEs operating in the communications network, a queue length for the tentatively scheduled second subset of the first UEs operating in the communications network, and a wait time for the tentatively scheduled second subset of the first UEs operating in the communications network.

9. The method of claim 1, wherein a virtual transmission point is a coordinated multiple point.

10. A method for partitioning a communications network comprising a plurality of transmission points, the method comprising:
deriving, by a centralized controller, mutual intercell interference levels for transmission point pairs in the communications network from long term measures reported by user equipments (UEs) operating in the communications network;
partitioning, by the centralized controller, the communications network into a plurality of clusters in accordance with a merit measure, the merit measure comprising at least one of a sum proportional fairness of the UEs or a scheduling fairness, each cluster including groups of transmission points with mutual intercell interference levels exceeding an interference threshold and that are connected with a backhaul meeting a performance threshold, each cluster providing service to a different subset of the UEs operating in the communications network;
identifying, by the centralized controller, edge UEs from the UEs in each cluster based on a maximum CoMP geometry value, of a plurality of CoMP geometry values corresponding to each of the edge UEs, being below a threshold, each of the CoMP geometry values computed for a UE in a corresponding cluster, CoMP geometry values determined according to an estimate of at least one of channel quality values, reference signals, and path loss; and
storing, by the centralized controller, information about the plurality of clusters and the edge UEs in each cluster.

11. The method of claim 10, wherein deriving the mutual intercell interference levels comprises:
determining a mutual interference level for each transmission point pair in accordance with interference that a first transmission point in the transmission point pair causes to an impacted user equipment associated with a second transmission point in the transmission point pair; and
generating the mutual intercell interference levels from the mutual interference levels.

12. The method of claim 10, further comprising partitioning the communications network into the plurality of clusters in accordance with a maximum number of transmission points per cluster.

13. The method of claim 10, wherein at least one of the long term measures comprises a reference signal received power report.

14. A centralized controller comprising:
a processor; and
a non-transitory computer-readable storage medium storing a program to be executed by the processor, the program including instructions for:
generating a plurality of partition sets for a communications network in accordance with first mutual intercell interference levels for transmission point pairs in the communications network, each of the plurality of partition sets includes a plurality of transmission points, each of the plurality of partition sets having multiple sub-clusters, each of the sub-clusters containing at least one of the plurality of transmission points in the communications network, wherein each user equipment (UE) of all UEs served by the plurality of transmission points is not a sub-cluster edge UE in each of the sub-clusters of at least one partition set of the plurality of partition sets;
selecting a first partition set of the plurality of partition sets in accordance with a merit measure, the merit measure being a maximum measure of a plurality of merit measures derived from first user UEs operating in the communications network tentatively scheduled to each partition set of the plurality of partition sets, the merit measure comprising at least one of a sum proportional fairness of the first UEs or a scheduling fairness; and
scheduling a first subset of the first UEs operating in the communications network during a first resource unit in accordance with the selected first partition set.

15. The centralized controller of claim 14, wherein the program further includes instructions for:
deriving the first mutual intercell interference levels for the transmission point pairs from UE link weights, the UE link weights determined from at least one of long term measures reported by second UEs operating in the communications network and associated with the transmission point pairs, and short term measures reported by the second UEs operating in the communications network and associated with the transmission point pairs;
partitioning the communications network into a second partition set comprising a second plurality of virtual transmission points in accordance with the first mutual intercell interference levels for the transmission point pairs;
adjusting the UE link weights that exceed a weight threshold;
deriving second mutual intercell interference levels for the transmission point pairs from the adjusted UE link weights; and
partitioning the communications network into a third partition set comprising a third plurality of virtual transmission points in accordance with the second mutual intercell interference levels for the transmission point pairs.

16. The centralized controller of claim 15, wherein the program further includes instructions for:
partitioning the communications network into the second partition set in accordance with a maximum number of transmission points per virtual transmission point.

17. The centralized controller of claim 14, wherein the program further includes instructions for:
generating, for each fourth partition set in the plurality of partition sets, the merit measure for a second subset of the first UEs operating in the communications network and tentatively scheduled in accordance with the fourth partition set; and
selecting a fifth partition set associated with a largest merit measure of the plurality of merit measures as the first partition set.

18. The centralized controller of claim 17, wherein the program further includes instructions for:
tentatively scheduling the second subset of the first UEs operating in the communications network to communicate during the first resource unit, the tentatively scheduling performed in accordance with the fourth partition set; and determining the merit measure for the tentatively scheduled second subset of the first UEs operating in the communications network.

19. A centralized controller comprising:

a processor; and a non-transitory computer-readable storage medium storing a program to be executed by the processor, the program including instructions for:

deriving mutual intercell interference levels for transmission point pairs in a communications network from long term measures reported by user equipments (UEs) operating in the communications network;

partitioning the communications network into a plurality of clusters in accordance with a merit measure, the merit measure comprising at least one of a sum proportional fairness of the UEs or a scheduling fairness, each cluster including groups of transmission points with mutual intercell interference levels exceeding an interference threshold and that are connected with a backhaul meeting a performance threshold, each cluster providing service to a different subset of the UEs operating in the communications network;

identifying, by the centralized controller, edge UEs from the UEs in each cluster based on a maximum CoMP geometry value, of a plurality of CoMP geometry values corresponding to each of the edge UEs, being below a threshold, each of the CoMP geometry values computed for a UE in a corresponding cluster, CoMP geometry values determined according to an estimate of at least one of channel quality values, reference signals, and path loss; and storing information about the plurality of clusters and the edge UEs in each cluster.

20. The centralized controller of claim 19, wherein the program further includes instructions for:

determining a mutual interference level for each transmission point pair in accordance with interference that a first transmission point in the transmission point pair causes to an impacted user equipment associated with a second transmission point in the transmission point pair; and generating the mutual intercell interference levels from the mutual interference levels.

21. The centralized controller of claim 19, wherein the program further includes instructions for:

partitioning the communications network into the plurality of clusters in accordance with a maximum number of transmission points per cluster.

22. The method of claim 1, wherein the merit measure is a greatest merit measure of merit measures for the plurality of partition sets.

23. The centralized controller of claim 14, wherein the merit measure is a greatest merit measure of merit measures for the plurality of partition sets.

* * * * *